US012544606B2

(12) United States Patent
Lingo

(10) Patent No.: US 12,544,606 B2
(45) Date of Patent: Feb. 10, 2026

(54) PERSONAL FALL ARREST SYSTEM WITH TRANSMITTING ALERT MODULE

(71) Applicant: Paul Lingo, Federal Heights, CO (US)

(72) Inventor: Paul Lingo, Federal Heights, CO (US)

( * ) Notice: Subject to any disclaimer, the term of this patent is extended or adjusted under 35 U.S.C. 154(b) by 444 days.

(21) Appl. No.: 18/123,284

(22) Filed: Mar. 19, 2023

(65) Prior Publication Data

US 2024/0307717 A1 Sep. 19, 2024

(51) Int. Cl.
*A62B 35/04* (2006.01)
*A62B 35/00* (2006.01)

(52) U.S. Cl.
CPC ...... *A62B 35/0075* (2013.01); *A62B 35/0025* (2013.01); *A62B 35/0068* (2013.01); *A62B 35/0093* (2013.01); *A62B 35/04* (2013.01)

(58) Field of Classification Search
None
See application file for complete search history.

(56) References Cited

U.S. PATENT DOCUMENTS 5,174,410 A * 12/1992 Casebolt ................. F16F 7/006 188/371
6,279,680 B1 * 8/2001 Casebolt ............... E04G 21/329 188/371
7,106,205 B2 * 9/2006 Graef ................. A62B 35/0012 340/687
7,893,844 B2 * 2/2011 Gottlieb ............. G08B 21/0446 340/539.12
D648,522 S 11/2011 Gorman
8,584,799 B1 * 11/2013 Dennington ........... A62B 35/04 182/4
8,675,823 B2 * 3/2014 Hooten .................. A62B 35/04 379/37
8,757,324 B2 6/2014 Renton
9,153,115 B1 * 10/2015 Ulner ................... G08B 25/016
9,704,370 B2 * 7/2017 Ulner ................. A62B 35/0075
9,799,197 B2 10/2017 Pham
9,852,598 B1 * 12/2017 Thompson ......... A62B 35/0093
9,978,242 B2 * 5/2018 Ulner ................. G08B 21/0446
10,223,898 B2 * 3/2019 Pham ...................... A62B 35/04
10,650,664 B2 * 5/2020 Pham ................. A62B 35/0018
10,828,517 B2 * 11/2020 Bhaskarwar ....... A62B 35/0025
(Continued)

FOREIGN PATENT DOCUMENTS

EP 4477276 A2 * 12/2024 ......... A62B 35/0018
EP 3397355 B1 * 1/2025 ......... A62B 35/0018
WO WO2019025345 7/2019

*Primary Examiner* — Robert Canfield

(57) ABSTRACT

A personal fall arrest assembly for shortening a response time in event of a fall includes a line, which has a connector and a coupler attached to its first end and second end, respectively. The connector and the coupler are selectively attachable to a structure, or an adaptation to the structure, and to a harness worn by a user, respectively. The line thus tethers the user to the structure. A deceleration device is attached to the line and is absorbs energy as the line arrests a fall of the user. A sensor is operationally engaged to the deceleration device and is detects actuation of the deceleration device. An alert module, which is attached to the line and which is operationally engaged to the sensor, comprises a transmitter so that the alert module selectively transmits an emergency alert upon the sensor detecting actuation of the deceleration device.

7 Claims, 5 Drawing Sheets

(56) References Cited

U.S. PATENT DOCUMENTS

| | | | | |
|---|---|---|---|---|
| 11,024,153 | B2 * | 6/2021 | Pham | A62B 35/0025 |
| 11,235,185 | B1 * | 2/2022 | Truesdell | A62B 35/0075 |
| 11,266,862 | B2 * | 3/2022 | Thompson | A62B 35/0075 |
| 11,663,897 | B2 * | 5/2023 | Meyers | A62B 35/0068 340/539.11 |
| 12,161,895 | B2 * | 12/2024 | Altemose | G01C 5/06 |
| 12,208,293 | B2 * | 1/2025 | Damaske | A62B 35/0018 |
| 2006/0055545 | A1 * | 3/2006 | Graef | A62B 35/0012 340/573.1 |
| 2008/0060872 | A1 * | 3/2008 | Wise | A62B 35/0006 182/3 |
| 2010/0231402 | A1 * | 9/2010 | Flynt | G08B 19/00 340/679 |
| 2010/0282541 | A1 * | 11/2010 | Renton | A62B 1/18 182/234 |
| 2011/0090079 | A1 * | 4/2011 | Morino | A62B 35/0075 340/532 |
| 2012/0101770 | A1 * | 4/2012 | Grabiner | G16H 50/20 702/155 |
| 2014/0008147 | A1 * | 1/2014 | Jones | A62B 35/0018 182/3 |
| 2015/0027808 | A1 * | 1/2015 | Baillargeon | A62B 35/0025 182/19 |
| 2016/0027279 | A1 * | 1/2016 | Ulner | G08B 25/016 340/573.1 |
| 2016/0107007 | A1 * | 4/2016 | Pollard | A62B 35/0075 182/3 |
| 2017/0193799 | A1 * | 7/2017 | Holub | A62B 35/0075 |
| 2017/0309151 | A1 * | 10/2017 | Ulner | G08B 25/016 |
| 2017/0374436 | A1 * | 12/2017 | Awiszus | H04Q 9/00 |
| 2018/0107169 | A1 * | 4/2018 | Hu | A62B 35/0093 |
| 2018/0126198 | A1 * | 5/2018 | Troy | B66F 11/044 |
| 2018/0207455 | A1 * | 7/2018 | Thompson | A62B 35/0093 |
| 2019/0012900 | A1 * | 1/2019 | Pham | A62B 35/0025 |
| 2019/0022439 | A1 * | 1/2019 | Dillon | G08B 21/02 |
| 2019/0250053 | A1 * | 8/2019 | Moreau | G01L 5/047 |
| 2019/0371159 | A1 * | 12/2019 | Pham | G08B 25/016 |
| 2020/0047006 | A1 * | 2/2020 | Blackford | H02J 7/32 |
| 2020/0198952 | A1 * | 6/2020 | Lepoutre | B66F 11/044 |
| 2020/0230445 | A1 * | 7/2020 | Auston | A62B 35/0037 |
| 2020/0242915 | A1 * | 7/2020 | Pham | A62B 35/04 |
| 2021/0016115 | A1 * | 1/2021 | Bhaskarwar | A62B 35/0025 |
| 2021/0023401 | A1 * | 1/2021 | Thompson | H04B 1/034 |
| 2022/0254240 | A1 * | 8/2022 | Meyers | G08B 21/043 |
| 2024/0033545 | A1 * | 2/2024 | Altemose | G06Q 50/265 |
| 2025/0078641 | A1 * | 3/2025 | Jacob | G08B 21/0461 |

* cited by examiner

PERSONAL FALL ARREST SYSTEM WITH TRANSMITTING ALERT MODULE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fall arrest devices and more particularly pertains to a new fall arrest device for shortening a response time in event of a fall. The present invention discloses a fall arrest device having a cord engaged to a switch, wherein the cord is shorter than a line that arrests a fall of a user and pulling of the cord from the switch actuates a transmitter to send an emergency alert.

(2) Description of Related Art Including Information Disclosed Under 37 CFR 1.97 and 1.98

The prior art relates to fall arrest devices, which may comprise sensors for determining distances between opposed ends of lanyards falls, conducting threads, strap tightening, or inclinometers as means of detecting. Prior art fall arrest devices also may comprise transmitters for sending notifications of falls. What is lacking in the prior art is a fall arrest device comprising a cord engaged to a switch, wherein the cord is shorter than a line that arrests a fall of a user and pulling of the cord from the switch actuates a transmitter to send an emergency alert. Further lacking in the prior art is such a device comprising one or more of a speaker, for generating an audible alert, a bulb, for generating a visual alert, and a receiver for obtaining positional coordinates of a user.

BRIEF SUMMARY OF THE INVENTION

An embodiment of the disclosure meets the needs presented above by generally comprising a line, which has a connector and a coupler attached to its first end and second end, respectively. The connector and the coupler are configured to selectively attach to a structure, or an adaptation to the structure, and to a harness worn by a user, respectively. The line thus is configured to tether the user to the structure. A deceleration device is attached to the line and is configured to absorb energy as the line arrests a fall of the user. A sensor is operationally engaged to the deceleration device and is configured to detect actuation of the deceleration device. An alert module, which is attached to the line and which is operationally engaged to the sensor, comprises a transmitter so that the alert module is configured to selectively transmit an emergency alert upon the sensor detecting actuation of the deceleration device.

Another embodiment of the disclosure includes a personal fall arrest system, which comprises a harness, which is worn by a user, a structure, and a line. A connector and a coupler attached to first and second ends of the line, respectively are connected to the structure and to the harness, respectively, so that the line tethers the user to the structure. A deceleration device and an alert module are attached to the line, with the former being configured to absorb energy as the line arrests a fall of the user. A sensor is operationally engaged to the deceleration device and is configured to detect actuation of the deceleration device. The alert module comprises a transmitter and thus is configured to selectively transmit an emergency alert upon the sensor detecting actuation of the deceleration device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
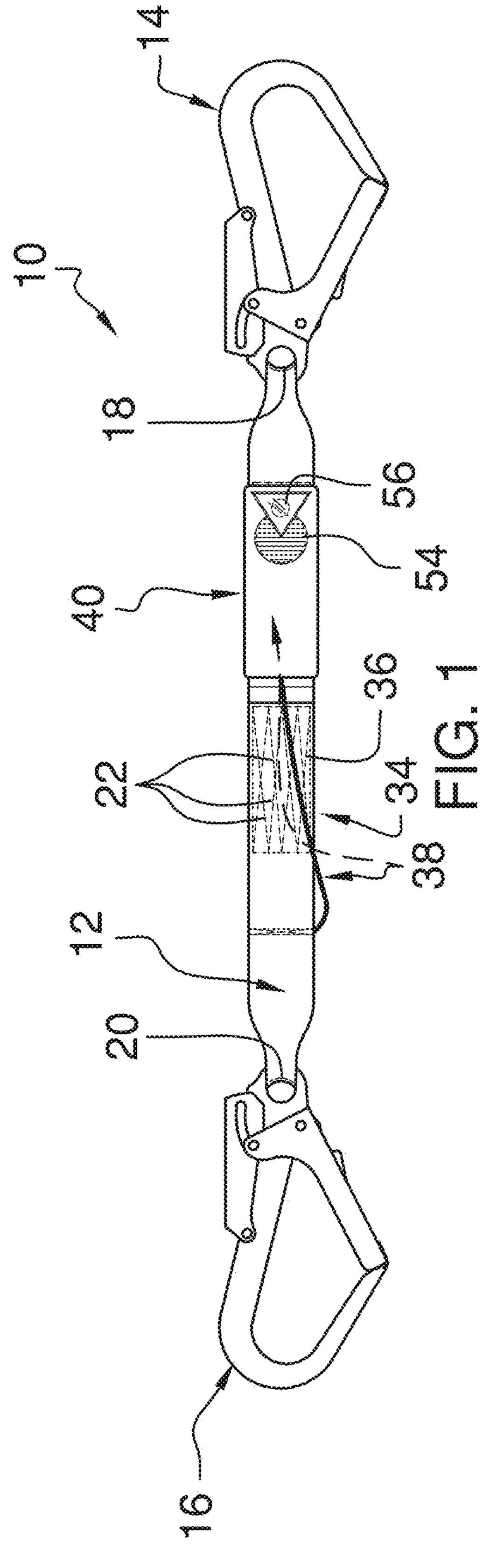
FIG. 1 is a top view of a personal fall arrest assembly according to an embodiment of the disclosure.
Figure 2:
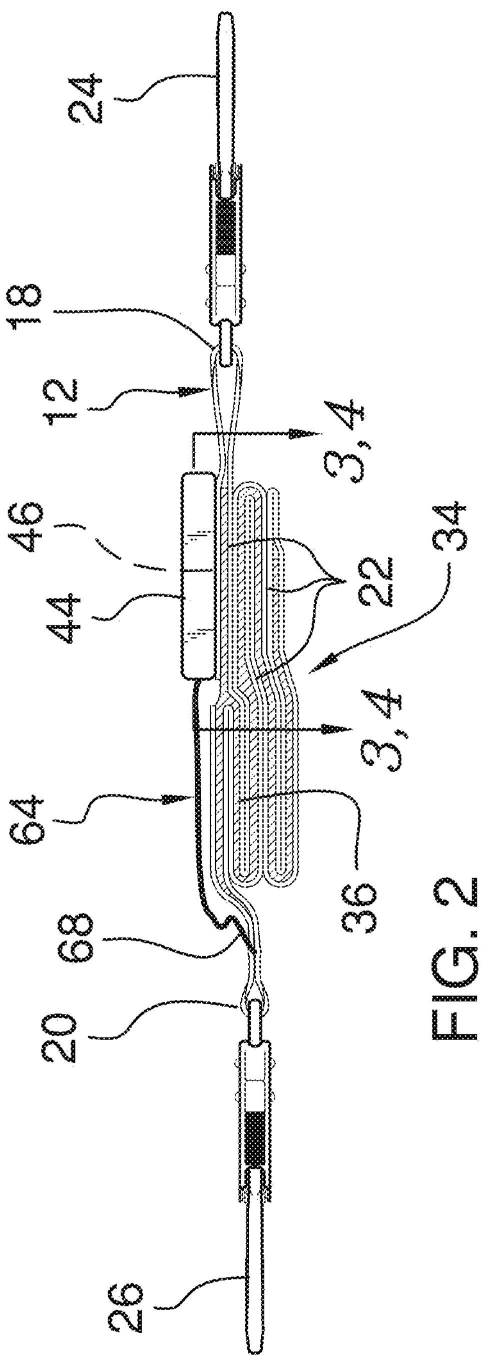
FIG. 2 is a side view of an embodiment of the disclosure.
Figure 3:
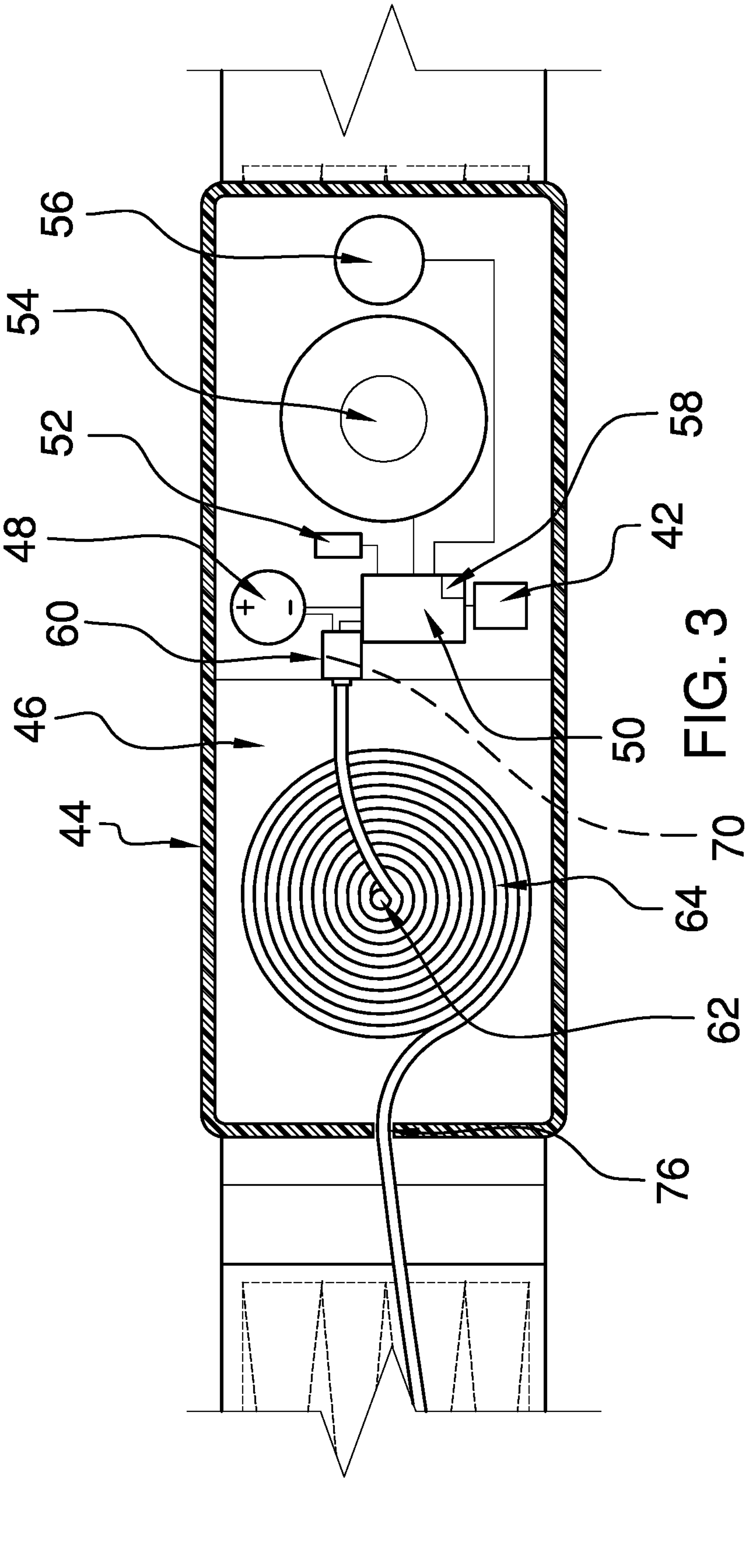
FIG. 3 is a cross-sectional view of an embodiment of the disclosure.
Figure 4:
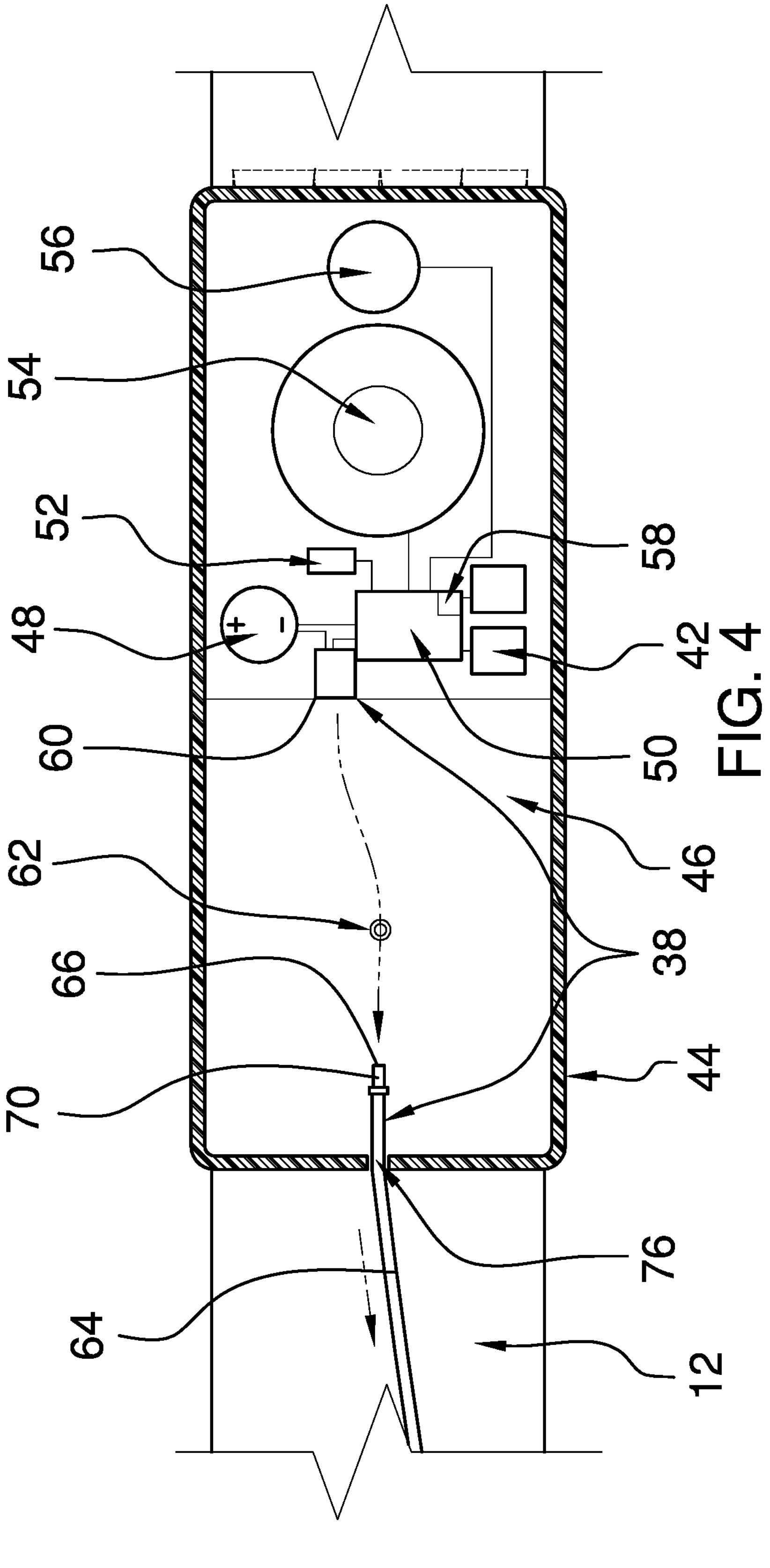
FIG. 4 is a cross-sectional view of an embodiment of the disclosure.

With reference now to the drawings, and in particular to FIGS. 1 through 6 thereof, a new fall arrest device embodying the principles and concepts of an embodiment of the disclosure and generally designated by the reference numeral 10 will be described.

Figure 5:
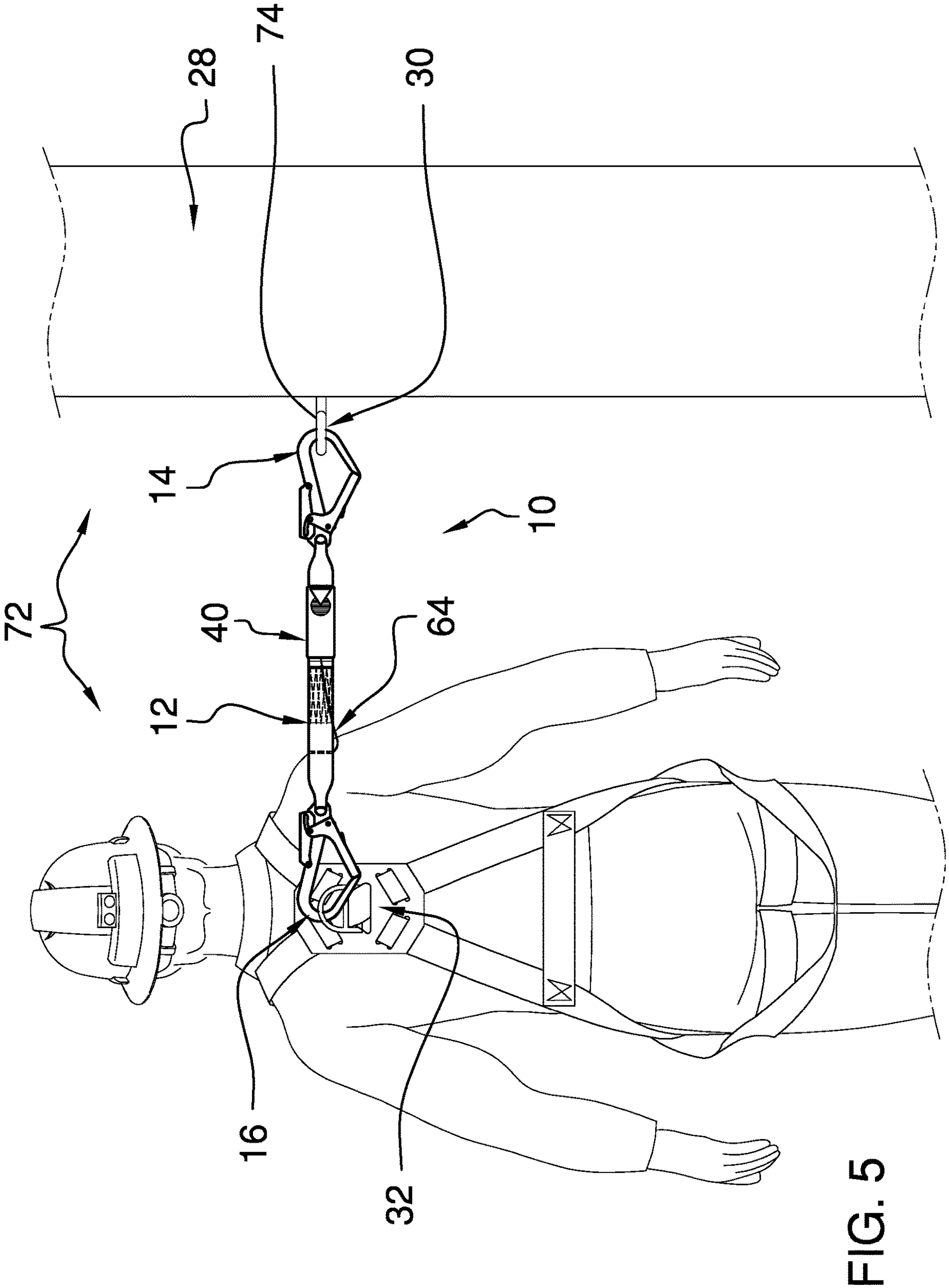
FIG. 5 is an in-use view of an embodiment of the disclosure.

As best illustrated in FIGS. 1 through 6, the personal fall arrest assembly 10 generally comprises a line 12, which has a connector 14 and a coupler 16 attached to its first end 18 and second end 20, respectively. The line 12 is configured as a plurality of loops 22 so that the line 12 is selectively extensible. As shown in FIG. 1, the connector 14 and the coupler 16 comprise a first carabiner 24 and a second carabiner 26, respectively, although other connecting means known to those skilled in the art of fall arrest devices are anticipated by the present invention. The connector 14 and the coupler 16 are configured to selectively attach to a structure 28, or an adaptation 30 to the structure 28, and to a harness 32 that is being worn by a user, respectively. The line 12 thus is configured to tether the user to the structure 28, as is shown in FIG. 5.

Figure 6:
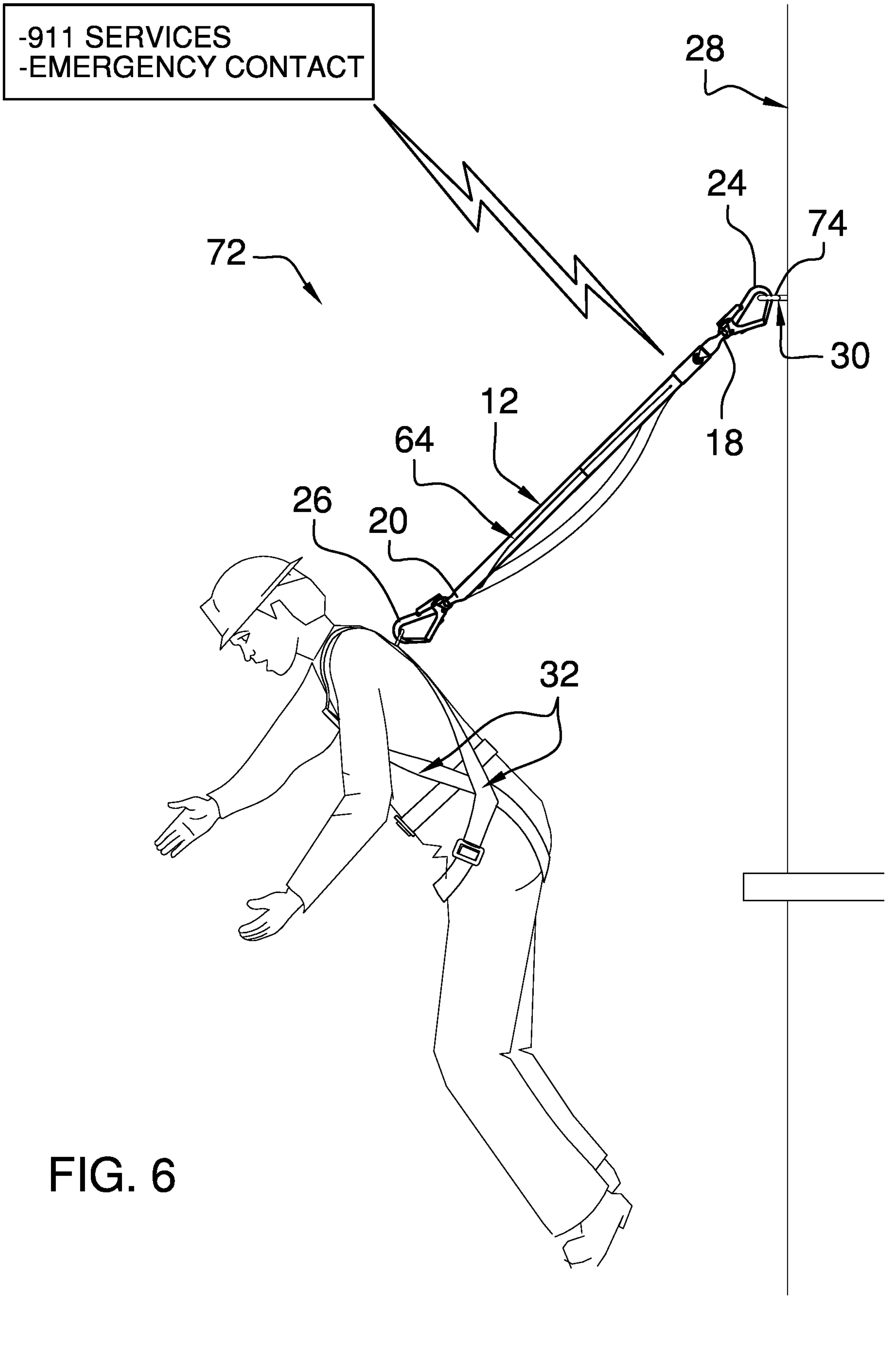
FIG. 6 is an in-use view of an embodiment of the disclosure.

A deceleration device 34 is attached to the line 12 and is configured to absorb energy as the line 12 arrests a fall of the user, as is shown in FIG. 6. The present invention anticipates at least a segment 36 of the line 12 being resiliently stretchable so that the line 12 itself comprises the deceleration device 34. The present invention also anticipates the deceleration device 34 comprising other the deceleration means known to those skilled in the art of fall arrest devices, such as, but not limited to, rip-stitch lanyards, specially woven lanyards, tearing or deforming lanyards, and automatic self-retracting lanyards. It is anticipated that the personal fall arrest assembly 10 would be manufactured to meet the force standards contained in Federal OSHA 29CFR1910.66, Appendix C.

A sensor 38 is operationally engaged to the deceleration device 34 and is configured to detect actuation of the deceleration device 34. An alert module 40, which is attached to the line 12 and which is operationally engaged to the sensor 38, comprises a transmitter 42 so that the alert module 40 is configured to selectively transmit an emergency alert upon the sensor 38 detecting actuation of the deceleration device 34.

The alert module 40 comprises a housing 44, which defines an interior space 46 and which is attached to the line 12 proximate its first end 18. The alert module 40 also could be attached to the line 12 proximate to its second end 20. The transmitter 42, a battery 48, and a microprocessor 50 are attached to the housing 44 and are positioned in the interior space 46. The microprocessor 50 is operationally engaged to the sensor 38, the transmitter 42, and the battery 48.

The alert module 40 also may comprise a receiver 52, which is attached to the housing 44, positioned in the interior space 46, and operationally engaged to the microprocessor 50. The receiver 52 is Global Positioning System enabled and thus is configured to selectively receive positional coordinates of the user. The microprocessor 50 is enabled to selectively actuate the transmitter 42 to transmit the positional coordinates of the user. Transmitting the positional coordinates of the user to emergency responders facilitates a rapid response time in event of a fall and limits adverse consequences from suspension trauma.

The alert module 40 also may comprise a speaker 54, which is attached to the housing 44 and operationally engaged to the microprocessor 50. The microprocessor 50 is enabled to selectively actuate the speaker 54 to broadcast an audible alert upon the sensor 38 detecting actuation of the deceleration device 34. The audible alert may garner the attention of a person or persons nearby who may be positioned to render assistance to the user.

The alert module 40 also may comprise a bulb 56, which is attached to the housing 44 and which is operationally engaged to the microprocessor 50. The microprocessor 50 is enabled to selectively actuate the bulb 56 to provide a visual alert upon the sensor 38 detecting actuation of the deceleration device 34. The bulb 56 is configured for intermittent illumination so that the bulb 56 strobes. As with the audible alert, the visual alert may garner the attention of the person or persons nearby who may be positioned to render assistance to the user.

The alert module 40 also may comprise a timer 58, which is attached to the housing 44, positioned in the interior space 46, and operationally engaged to the microprocessor 50. The microprocessor 50 is enabled to measure elapsed time between actuation of the deceleration device 34 and a response to the fall of the user.

The sensor 38 may comprises a switch 60, which is attached to the housing 44, positioned in the interior space 46, and operationally engaged to the microprocessor 50 and the battery 48. The switch 60 is spring loaded so that the switch 60 defaults to a closed configuration. A spool 62 is attached to the housing 44 and is positioned in the interior space 46. A cord 64 having a first terminus 66 and a second terminus 68 is loopedly positioned around the spool 62 so that the cord 64 is selectively extensible through a hole 76 in the housing 44 concurrently with extension of the line 12. A first segment 70 of the cord 64 adjacent to its first terminus 66 is slidably inserted into the switch 60 so that the first segment 70 retains the switch 60 in an open configuration. The second terminus 68 of the cord 64 is attached to the line 12 proximate to its second end 20 so that the cord 64 extends concurrently with the line 12 as the user falls. The cord 64 is shorter than the line 12 so that the first segment 70 is pulled from the switch 60 to actuate the switch 60 when the line 12 is substantially fully extended. The present invention anticipates the sensor 38 comprising other sensing means, such as single axis accelerometers, multi axis accelerometers, or the like.

The present invention also anticipates a personal fall arrest system 72, which comprises a harness 32, which is worn by a user, a structure 28, and a line 12. A connector 14 that is attached to a first end 18 of the line 12 is connected to the structure 28. A coupler 16 that is attached to a second end 20 of the line 12 is attached to the harness 32 so that the line 12 tethers the user to the structure 28. A deceleration device 34 is attached to the line 12 and is configured to absorb energy as the line 12 arrests a fall of the user, as shown in FIG. 6. A sensor 38 is operationally engaged to the deceleration device 34 and is configured to detect actuation of the deceleration device 34. An alert module 40, which comprises a transmitter 42, is attached to the line 12 and is operationally engaged to the sensor 38. The alert module 40 is configured to selectively transmit an emergency alert upon the sensor 38 detecting actuation of the deceleration device 34. The personal fall arrest system 72 also may comprise an adaptation 30 to the structure 28, with the connector 14 being attached to the adaptation 30. As shown in FIGS. 5 and 6, the adaptation 30 comprises an anchor ring 74.

In one example of use, the connector 14 and the coupler 16 are attached to a structure 28 and to a harness 32 worn by a user, respectively. The line 12 thus tethers the user to the structure 28. Should the user fall, the deceleration device 34 absorbs energy as the line 12 arrests the fall. The sensor 38 detects actuation of the deceleration device 34 and the alert module 40, via its transmitter 42, transmits an emergency alert upon the sensor 38 detecting actuation of the deceleration device 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A personal fall arrest system comprising:
- a harness worn by a user;
- a structure;
- a line;
- a connector attached to a first end of the line and being connected to the structure;
- a coupler attached to a second end of the line and being attached to the harness, such that the line tethers the user to the structure;
- a deceleration device attached to the line and being configured for absorbing energy as the line arrests a fall of the user;
- a sensor operationally engaged to the deceleration device and being configured for detecting actuation of the deceleration device; and
- an alert module attached to the line and being operationally engaged to the sensor, the alert module comprising a transmitter, wherein the alert module is configured for selectively transmitting an emergency alert upon the sensor detecting actuation of the deceleration device;
- wherein the alert module comprises:
  - a housing defining an interior space and being attached to the line proximate to the first end of the line, the transmitter being attached to the housing and positioned in the interior space,
  - a battery attached to the housing and positioned in the interior space,
  - a microprocessor attached to the housing and positioned in the interior space, the microprocessor being operationally engaged to the sensor, the transmitter, and the battery, and
  - a receiver attached to the housing, positioned in the interior space, and operationally engaged to the microprocessor, the receiver being Global Positioning System enabled, such that the receiver is configured for selectively receiving positional coordinates of the user, such that the microprocessor is enabled for selectively actuating the transmitter for transmitting the positional coordinates of the user; and
- wherein the sensor comprises:
  - a switch attached to the housing, positioned in the interior space, and operationally engaged to the microprocessor and the battery, the switch being spring loaded, such that the switch defaults to a closed configuration, and
  - a cord positioned in the interior space, the cord having first terminus and a second terminus, a first segment adjacent to the first terminus being slidably inserted into the switch, such that the first segment retains the switch in an open configuration, the second terminus being attached to the line proximate to the second end of the line, such that the cord extends concurrently with the line as the user falls, the cord being shorter than the line, such that the first segment is pulled from the switch for actuating the switch when the line is substantially fully extended.

2. The personal fall arrest system of claim 1, further including an adaptation to the structure, the connector being attached to the adaptation.

3. The personal fall arrest system of claim 2, wherein the adaptation comprises an anchor ring.

4. The personal fall arrest system of claim 1, wherein:
- the line is configured as a plurality of loops, such that the line is selectively extensible, at least a segment of the line being resiliently stretchable such that the line comprises the deceleration device;
- the connector comprising a first carabiner; and
- the coupler comprising a second carabiner.

5. The personal fall arrest system of claim 1, further including:
- a speaker attached to the housing and operationally engaged to the microprocessor, such that the microprocessor is enabled for selectively actuating the speaker for broadcasting an audible alert upon the sensor detecting actuation of the deceleration device;
- a bulb attached to the housing and operationally engaged to the microprocessor, such that the microprocessor is enabled for selectively actuating the bulb for providing a visual alert upon the sensor detecting actuation of the deceleration device, the bulb being configured for intermittent illumination such that the bulb strobes; and
- a timer attached to the housing, positioned in the interior space, and operationally engaged to the microprocessor, such that the microprocessor is enabled for measuring elapsed time between actuation of the deceleration device and a response to the fall of the user.

6. The personal fall arrest system of claim 1, further including a spool attached to the housing and positioned in the interior space, the cord being loopedly positioned around the spool, such that the cord is selectively extensible through a hole in the housing concurrently with extension of the line.

7. A personal fall arrest assembly comprising:
- a line configured as a plurality of loops, such that the line is selectively extensible;
- a connector attached to a first end of the line and being configured for connecting to a structure or an adaptation to the structure, the connector comprising a first carabiner;
- a coupler attached to a second end of the line and being configured for selectively attaching to a harness worn by a user, wherein the line is configured for tethering the user to the structure; the coupler comprising a second carabiner;
- a deceleration device attached to the line and being configured for absorbing energy as the line arrests a fall of the user, at least a segment of the line being resiliently stretchable such that the line comprises the deceleration device;
- a sensor operationally engaged to the deceleration device and being configured for detecting actuation of the deceleration device;

an alert module attached to the line and being operationally engaged to the sensor, the alert module comprising a transmitter, wherein the alert module is configured for selectively transmitting an emergency alert upon the sensor detecting actuation of the deceleration device, the alert module comprising:

a housing defining an interior space and being attached to the line proximate to the first end of the line, the transmitter being attached to the housing and positioned in the interior space, a battery attached to the housing and positioned in the interior space, a microprocessor attached to the housing and positioned in the interior space, the microprocessor being operationally engaged to the sensor, the transmitter, and the battery, a receiver attached to the housing, positioned in the interior space, and operationally engaged to the microprocessor, the receiver being Global Positioning System enabled, such that the receiver is configured for selectively receiving positional coordinates of the user, such that the microprocessor is enabled for selectively actuating the transmitter for transmitting the positional coordinates of the user, a speaker attached to the housing and operationally engaged to the microprocessor, such that the microprocessor is enabled for selectively actuating the speaker for broadcasting an audible alert upon the sensor detecting actuation of the deceleration device, a bulb attached to the housing and operationally engaged to the microprocessor, such that the microprocessor is enabled for selectively actuating the bulb for providing a visual alert upon the sensor detecting actuation of the deceleration device, the bulb being configured for intermittent illumination such that the bulb strobes, and a timer attached to the housing, positioned in the interior space, and operationally engaged to the microprocessor, such that the microprocessor is enabled for measuring elapsed time between actuation of the deceleration device and a response to the fall of the user; and the sensor comprising:

a switch attached to the housing, positioned in the interior space, and operationally engaged to the microprocessor and the battery, the switch being spring loaded, such that the switch defaults to a closed configuration, a cord positioned in the interior space, the cord having first terminus and a second terminus, a first segment adjacent to the first terminus being slidably inserted into the switch, such that the first segment retains the switch in an open configuration, the second terminus being attached to the line proximate to the second end of the line, such that the cord extends concurrently with the line as the user falls, the cord being shorter than the line, such that the first segment is pulled from the switch for actuating the switch when the line is substantially fully extended, and a spool attached to the housing and positioned in the interior space, the cord being loopedly positioned around the spool, such that the cord is selectively extensible through a hole in the housing concurrently with extension of the line.

* * * * *